United States Patent [19]
Ishida et al.

[11] Patent Number: 5,451,317
[45] Date of Patent: Sep. 19, 1995

[54] SOLID-LIQUID SEPARATOR

[75] Inventors: Hiroshi Ishida; Kiyoshi Izumi, both of Osaka, Japan; Shuzo Matsumura, London, United Kingdom

[73] Assignee: Kubota Corporation, Osaka, Japan

[21] Appl. No.: 303,215

[22] Filed: Sep. 8, 1994

[51] Int. Cl.⁶ .............................................. B01D 24/00
[52] U.S. Cl. .................................... 210/332; 210/406; 210/416.1; 210/321.75; 210/321.84; 210/150; 210/151; 210/335; 210/340
[58] Field of Search ...................... 210/332, 406, 416.1, 210/420, 433.1, 321.75, 321.84, 295, 256, 253, 195.1, 257.1, 257.2, 195.2, 150, 151, 340, 335

[56] References Cited

U.S. PATENT DOCUMENTS

| | | | |
|---|---|---|---|
| 5,096,583 | 3/1992 | Ishida et al. | 210/416.1 |
| 5,192,456 | 3/1993 | Ishida et al. | 210/323.2 |
| 5,227,076 | 7/1993 | Bogen et al. | 210/257.2 |

FOREIGN PATENT DOCUMENTS

| | | | |
|---|---|---|---|
| 0322753 | 7/1989 | European Pat. Off. | 210/323.2 |
| 93004762 | 3/1993 | WIPO | 210/323.2 |

*Primary Examiner*—Robert A. Dawson
*Assistant Examiner*—Ana M. Fortuna
*Attorney, Agent, or Firm*—Barnes, Kisselle, Raisch, Choate, Whittemore & Hulbert

[57] ABSTRACT

A solid-liquid separator for sludge or the like comprising: a treating tank; means disposed in the treating tank for establishing a horizontal flow therein; and a plurality of stages of submerged filter systems arranged in the treating tank sequentially in the direction of the horizontal flow. This horizontal flow is used sequentially in the submerged filter systems so that the power to be consumed for establishing a scavenging flow can be reduced.

2 Claims, 7 Drawing Sheets

SOLID-LIQUID SEPARATOR

FIELD OF THE INVENTION

The present invention relates to a solid-liquid separator to be used in place of a sedimentation basin in an activated sludge process or a flocculant separation process.

BACKGROUND OF THE INVENTION

Figure 1:
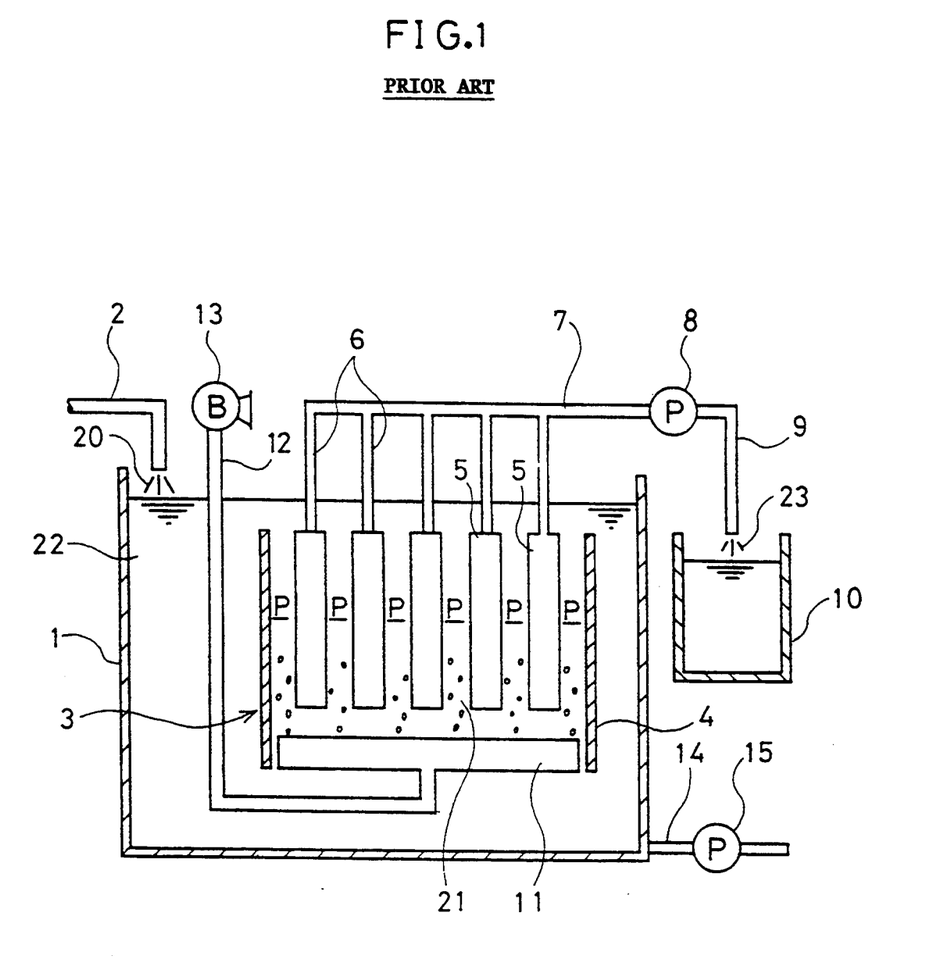
FIG. 1 is a schematic diagram showing the entire construction of the solid-liquid separator of the prior art.

The solid-liquid separator of the prior art is exemplified by a submerged filter system for purification, as shown in FIG. 1. As shown, a raw liquid supply pipe 2 is opened over one side of an aeration tank 1, in which is dipped a filter unit 3. This filter unit 3 is constructed by arranging a plurality of planar filtration membrane modules 5 vertically in a casing 4. These filtration membrane modules 5 are juxtaposed at a constant spacing to form a passage P between the adjacent ones of them. The filtration membrane modules 5 can be formed of a tubular filter medium of ceramics.

To the individual filtration membrane modules 5, there are connected suction tubes 6 which are made to communicate with a permeated liquid suction pipe 7. This permeated liquid suction pipe 7 has its other end connected to a suction pump 8, and a liquid feed pipe 9 is connected to the discharge side of the suction pump 8 and opened above a permeated liquid tank 10.

In the casing 4 of the filter unit 3, there is arranged below the filtration membrane modules 5 a diffuser 11 which is connected via a gas supply pipe 12 to a blower 13. In the bottom portion of the aeration tank 1, there is opened a sludge suction pipe 14 which is connected to a sludge pump 15.

Figure 2:
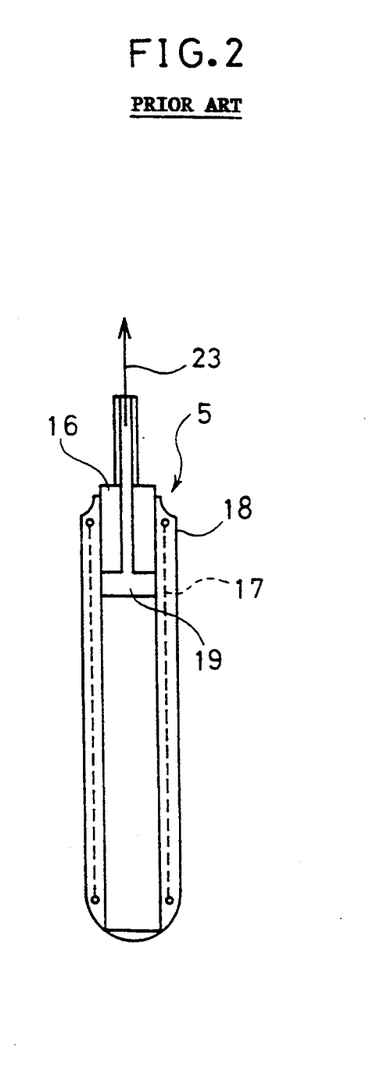
FIG. 2 is a section showing the membrane module which is used in the solid-liquid separator of the prior art.

As shown in FIG. 2, each filtration membrane module 5 is composed of a membrane supporting plate 16, a membrane supporting net 17 and a filtration membrane 18. The membrane supporting plate 16 is made of a resin and formed with a permeated liquid passage 19. This permeated liquid passage 19 has its one end opened in the surface of the membrane supporting plate 16 and its other end communicating with the corresponding one of the suction tubes 6.

For the process, a raw liquid 20 is supplied from its supply pipe 2, and an aeration gas 21 such as air containing oxygen is supplied to the diffuser 11 from the blower 13 via the gas supply pipe 12 so that it is injected from the diffuser 11 into the aeration tank 1 to purify the raw liquid 20 biologically.

On the other hand, a purified liquid 22 is subjected to the solid-liquid separation through the filtration membrane modules 5 by applying a vacuum to the permeated liquid passages 19 of the filtration membrane modules 5 via the permeated liquid suction pipe 7 and the suction tubes 6 by the suction pump 8. Then, a solid content such as sludge is trapped by the filtration membranes 18 whereas a permeated liquid 23 having passed through the filtration membranes 18 is sucked via the permeated liquid passages 19 and guided to the permeated liquid tank 10 by way of the suction tubes 6, the permeated liquid suction pipe 7, the suction pump 8 and the liquid feed pipe 9.

In this meanwhile, upward liquid flows are established in the passages P between the individual filtration membrane modules 5 by the air lifting action of the aeration gas 21 so that they act as scavenging flows along the membrane faces to suppress any blocking of the caking layer on the membrane faces.

Incidentally, in case the solid-liquid separator thus far described is to be applied to the treatment of sewage or sludge, it is desired to reduce the power consumption. In order to maintain the membrane scavenging flows, however, a certain rate of aeration is indispensable so that the reduction of the power consumption for the air blower is restricted to some extent. On the other hand, the demand for the aeration per unit filtration area could be reduced by enlarging the vertical length of the membrane modules. From the standpoint of maintenance, however, the desired vertical length is about 1 m at most.

SUMMARY OF THE INVENTION

The present invention has been conceived to solve the above-specified problem and has an object to provide a solid-liquid separator which can reduce the power consumption when applied to the activated sludge process for sewage, for example.

In order to achieve the above-specified object, according to the present invention, there is provided a solid-liquid separator comprising: a treating tank; means disposed in said treating tank for establishing a horizontal flow in the same; and a plurality of stages of submerged filter systems arranged in said treating tank sequentially in the direction of said horizontal flow, each of said submerged filter systems having a plurality of filtration membrane modules juxtaposed at a suitable spacing for forming the gaps between the adjacent ones of said filtration membrane modules into passages along said horizontal flow.

In the above-specified construction of the present invention, the horizontal flow to be established in the tank circulates sequentially through the submerged filter systems of the stages. In each of these systems, the horizontal flow flows through the passages between the adjacent filtration membrane modules as a scavenging flow for the membrane faces of the modules. This scavenging flow prevents the sludge or the like from depositing on the membrane faces of the individual filtration membrane modules. At this time, the horizontal flow having passed through the upstream submerged filter system goes into the downstream one so that it can be used sequentially by the submerged filter systems of the stages disposed in the treating tank thereby to reduce its power consumption.

In a more preferable construction of the present invention, diffusers are disposed below the submerged filter systems.

According to this construction, by feeding the gas from the diffusers disposed below the submerged filter systems, there are established upward flows which go along the membrane faces of the filtration membrane modules so that it can promote the rising effect of the scavenging flow. If the means for establishing the horizontal flow has no function to introduce oxygen, the gas feed from the diffusers is effective as the oxygen feeding means.

EMBODIMENTS

Figure 3:
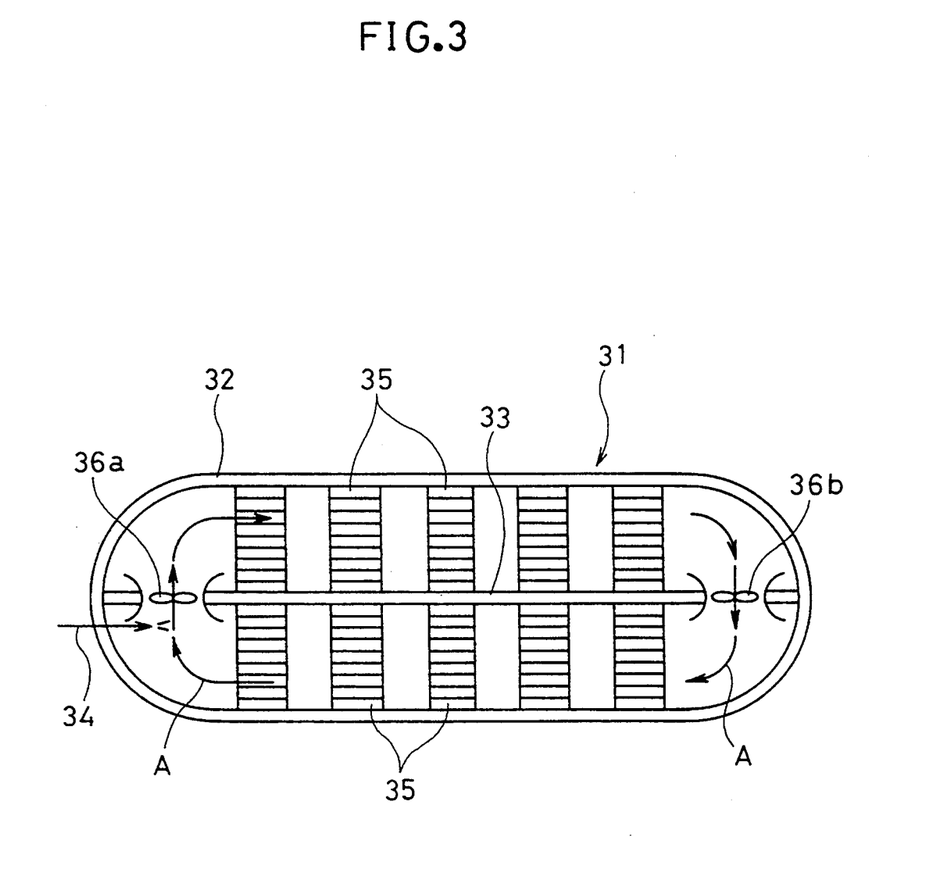
FIG. 3 is a schematic sectional view showing the entire construction of a solid-liquid separator according to one embodiment of the present invention.
Figure 4:
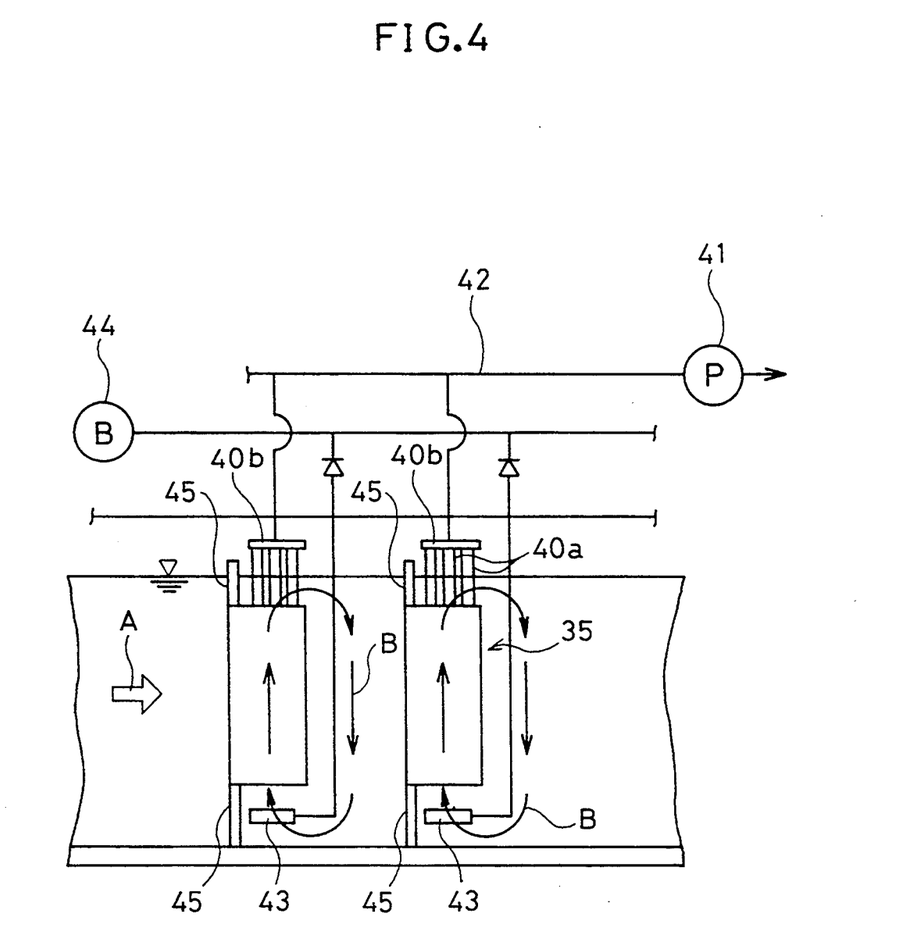
FIG. 4 is a schematic diagram showing a submerged filter system for purification to be used in the same solid-liquid separator.
Figure 5:
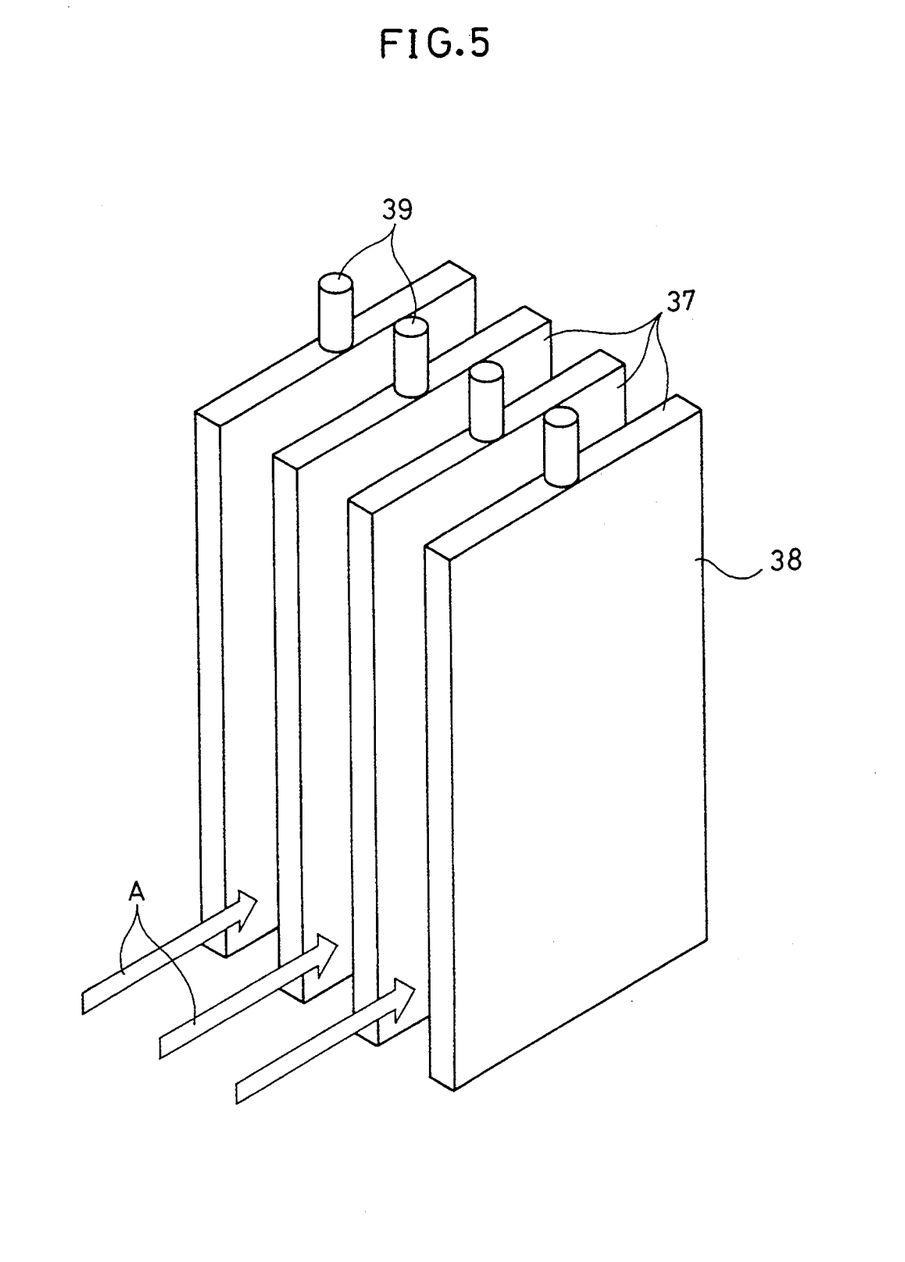
FIG. 5 is a perspective view showing a filtration membrane module to be used in the same submerged filter system.

The present invention will be described in the following in connection with its one embodiment with reference to the accompanying drawings. In FIGS. 3 to 5, a solid-liquid separator 31 is equipped with a generally elliptical treating tank 32, which has its inside divided by a partition 33, which is longitudinally extended at the center of the tank, into two halves to form ditches at the two sides of the partition 33. A raw liquid supply pipe 34 is opened in one side of the treating tank 32, and a plurality of stages of submerged filter systems 35 for purification are arranged at the two sides of the partition 33 sequentially along the ditches of the tank.

At the two end portions of the partition 33, there are individually arranged pumps 36a and 36b which constitute means for establishing horizontal flows in the treating tank 32. The horizontal flows (as indicated by arrows A) thus established by the pumps 36a and 36b sequentially circulate in the individual submerged filter systems 35 at the two sides of the partition 33.

As shown in FIGS. 4 and 5, each submerged filter system 35 has a plurality of filtration membrane modules 37 juxtaposed vertically at a suitable spacing such that they are arranged in parallel with the ditches of the treating tank 32, i.e., the horizontal flows A. As a result, the ditches thus formed between the adjacent filtration membrane modules 37 extend along the horizontal flows A.

Each filtration membrane module 37 is equipped with a nozzle 39 via the (not-shown) permeated liquid passage which is formed in the filtration membrane 38, and these nozzles 39 are connected to a suction header 40b via respective suction tubes 40a. The suction header 40b is connected via a permeated liquid suction pipe 42 to a suction pump 41 which is disposed outside of the treating tank 32. The permeated liquid having passed through the filtration membranes 38 is extracted by applying a vacuum to the permeated liquid passages by the suction of the suction pump 41.

As shown in FIG. 4, there are arranged below the submerged filter systems 35 diffusers 43 which are connected to blowers 44 disposed outside of the treating tank 32, so that the diffusers 43 can be fed with air or oxygen. Moreover, the submerged filter system 35 is equipped at its upper and lower end portions with guide plates 45 for guiding the horizontal flows A in the passages between the individual filtration membrane modules 37.

In the embodiment thus far described, when the raw liquid is supplied to the treating tank 31 from its supply pipe 34, it is mixed with the liquid to be treated in the tank. After this, the raw liquid is caused to flow at one side of the partition 33 as the horizontal flow A established by the pump 36a and to circulate downward sequentially through the submerged filter systems 35 which are arranged in the stages in the treating tank 31.

In this state, the suction pump 41 is energized to apply the vacuum to the permeated liquid passages of the filtration membrane modules 37 to separate the solid and liquid of the liquid to be treated, which flows in the ditches of the treating tank 32. The permeated liquid having passed through the filtration membranes 38 is extracted via the nozzles 39, the suction tubes 40a, the suction headers 40b and the permeated liquid suction pipe 42.

The liquid to be treated, as flowing as the horizontal flows A, circulates sequentially through the submerged filter systems 35 of the stages and is fed at the vicinity of the one end portion of the partition 33 to the other by the pump 36b. The aforementioned solid-liquid separating processes are repeated to separate the raw liquid into the solid and liquid while the horizontal flows A are circulating in the ditches of the treating tank At this time, the horizontal flows A in each submerged filter system 35 are guided at the upper and lower end portions of the filter system 35 by the guide plates 45 to mainly go into the passages between the filtration membrane modules 37 so that they become the scavenging flows in parallel with the faces of the filtration membranes 38 of the modules 37. These scavenging flows prevent the sludge or the like from depositing on the membrane faces of the individual filtration membrane modules Moreover, the horizontal flow A having passed through the submerged filter system 35 at the upstream side goes into the submerged filter system 35 at the downstream side so that these submerged filter systems 5 arranged in the stages in the treating tank 32 can use the same horizontal flow A sequentially to reduce the power to be consumed for rinsing the membrane faces.

In addition, the air or oxygen to be fed by the blower 44 is diffused from the diffusers 43 to establish upward flows, as indicated at arrows B. These upward flows B go along the faces of the filtration membranes 38 of the modules 37 so that the rinsing effect can be promoted. At the same time, it is possible to expect the peeling effect of the deposit of the membrane faces by the bubbles. When the oxygen has to be introduced for purifying the liquid to be treated, the supply of air or oxygen from the diffusers 43 is effective as the oxygen supply means.

Incidentally, the present embodiment has been described with the filtration membrane modules 37 being planar. However, these modules 37 can be made of a tubular filter medium of ceramics.

Figure 6:
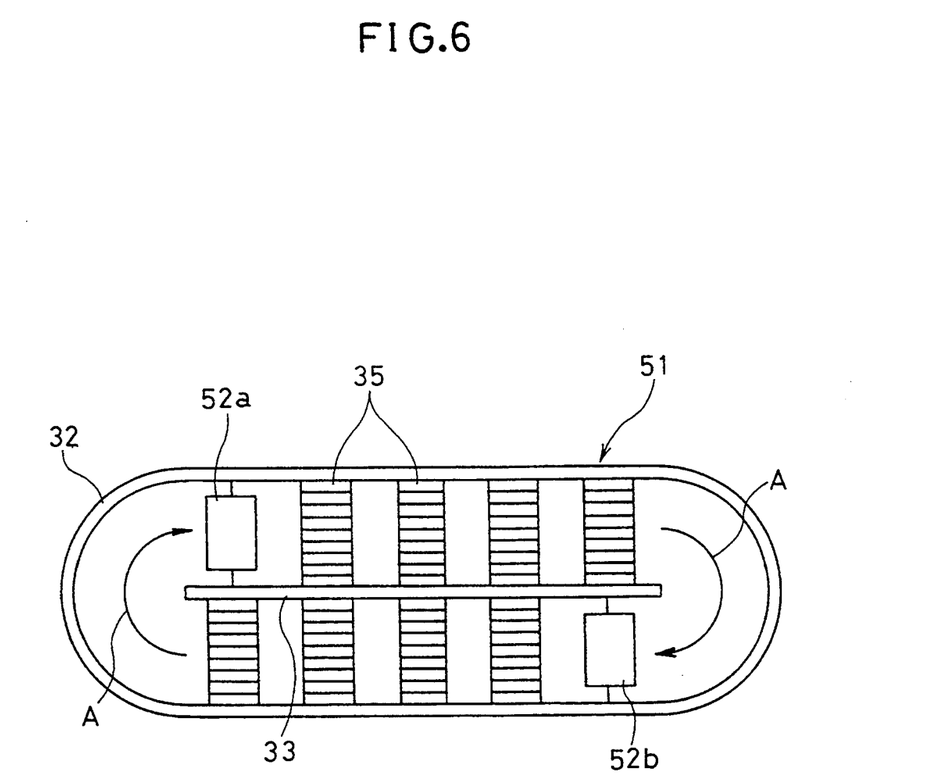
FIG. 6 is a schematic diagram showing the entire construction of a solid-liquid separator according to another embodiment of the present invention.
Figure 7:
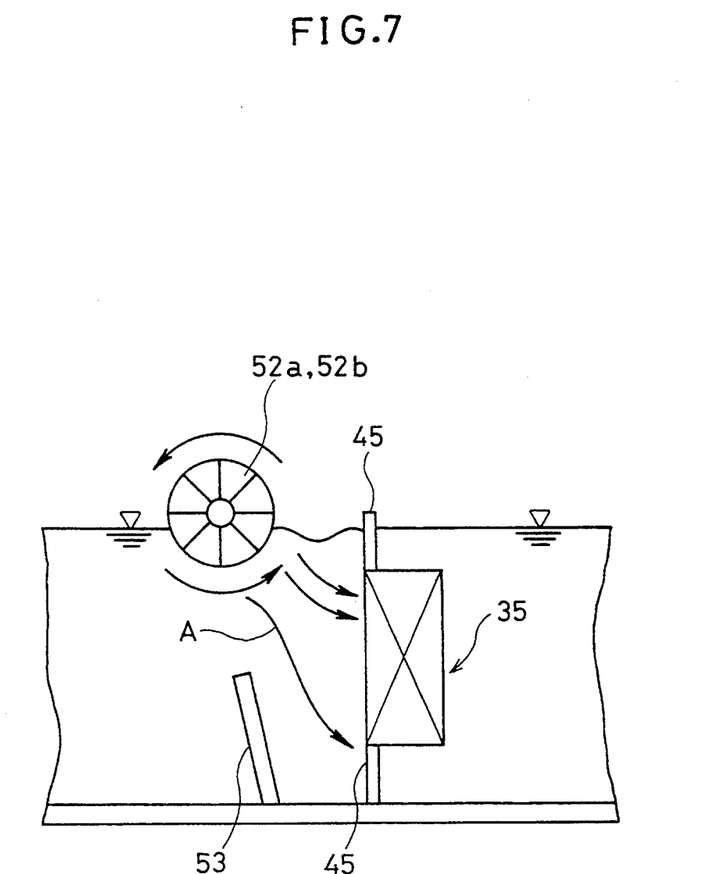
FIG. 7 is a section showing means to be used in the same solid-liquid separator for generating horizontal flows in the tank.

Here will be described a solid-liquid separator according to another embodiment of the present invention with reference to FIGS. 6 and 7. The solid-liquid separator of this embodiment, as designated at numeral 51, has substantially the same construction of the solid-liquid separator which has been described with reference to FIGS. 3 to 5. The description of the components having the same constructions and operations will be omitted by designating the components at the common numerals.

The solid-liquid separator 51 of this embodiment is different from that of the foregoing embodiment in that the partition 33 has its two ends spaced from the inner wall of the treating tank 32 and in that the pumps acting as the means for establishing the horizontal flows A are replaced by rotors 52a and 52b disposed in the treating bath 32.

The rotors 52a and 52b are arranged in line with the submerged filter systems 35 in the ditches at the two sides of the partition 33 and are so diagonally disposed that they may be at the longest distance. Moreover, the horizontal flows A are established by the rotations of the rotors 52a and 52b and fed to the submerged filter systems 35 downstream of the individual rotors 52a and 52b at the two sides of the partition 33. As shown in FIG. 7, still moreover, there is disposed below the rotor 52a or 52b a guide plate 53 for feeding the horizontal flow A established thereby mainly to the passages between the individual filtration membrane modules 37.

By this construction, too, the solid-liquid separation of the raw liquid is repeated as in the foregoing embodiment by the submerged filter systems 35 while the liquid to be treated is circulated in the treating tank 32. Since, moreover, the horizontal flows A established by the rotors 52a and 52b are fed as the scavenging flows to the submerged filter systems 35, the deposition of the sludge or the like on the surfaces of the filtration membranes 38 can be prevented to prevent the membrane faces from getting clogged. Still moreover, the liquid to be treated can be aerated with the oxygen while it is splashed into the air by the rotations of the rotors 52a and 52b, it can be fed with the oxygen necessary for the purification without providing any diffuser.

What is claimed is:

1. A solid-liquid separator comprising:
   a treating tank;
   means disposed in said treating tank for establishing a horizontal flow in said treating tank parallel to a bottom wall of said tank; and
   a plurality of stages of submerged filter systems arranged in said treating tank sequentially in the direction of said horizontal flow, each of said submerged filter systems having a plurality of filtration membrane modules juxtaposed at a suitable spacing for forming gaps between the adjacent filtration membrane modules providing passages along said horizontal flow, whereby the flow moves horizontally through said passages in each of said filter systems in sequence.

2. A solid-liquid separator according to claim 1, further comprising a plurality of gas diffusers disposed in said treating tank below said submerged filter systems.

* * * * *